US009105309B2

(12) United States Patent
Li et al.

(10) Patent No.: US 9,105,309 B2
(45) Date of Patent: Aug. 11, 2015

(54) ELECTRONIC DEVICE WITH DETACHABLE ELECTRONIC MODULE

(71) Applicants: Inventec (Pudong) Technology Corporation, Shanghai (CN); INVENTEC CORPORATION, Taipei (TW)

(72) Inventors: Ming-Gang Li, Shanghai (CN); Yu-Long Shen, Shanghai (CN); Ji-Peng Xu, Shanghai (CN)

(73) Assignees: INVENTEC (PUDONG) TECHNOLOGY CORPORATION, Shanghai (CN); INVENTEC CORPORATION, Taipei (CN)

(*) Notice: Subject to any disclaimer, the term of this patent is extended or adjusted under 35 U.S.C. 154(b) by 105 days.

(21) Appl. No.: 13/972,506

(22) Filed: Aug. 21, 2013

(65) Prior Publication Data

US 2014/0285977 A1   Sep. 25, 2014

(30) Foreign Application Priority Data

Mar. 20, 2013   (CN) .......................... 2013 1 0090821

(51) Int. Cl.
*H05K 5/00*   (2006.01)
*H05K 7/00*   (2006.01)
*G06F 1/16*   (2006.01)
*G11B 33/12*   (2006.01)

(52) U.S. Cl.
CPC .................................... *G11B 33/128* (2013.01)

(58) Field of Classification Search
CPC ......... G06F 1/188; G06F 1/184; G06F 1/181; G06F 1/185; G06F 1/1626; G06F 1/1656; G06F 2200/1632; G06F 1/1632; G06F 1/1698; G06F 1/187; H05K 7/1411; H05K 5/0021; H05K 7/1409; H05K 7/02; G02B 6/4246; H04M 1/0262; G11B 33/128; G11B 33/124
See application file for complete search history.

(56) References Cited

U.S. PATENT DOCUMENTS

| | | | | |
|---|---|---|---|---|
| 5,325,263 | A * | 6/1994 | Singer et al. | 361/679.39 |
| 6,008,984 | A * | 12/1999 | Cunningham et al. | 361/679.31 |
| 6,625,035 | B1 * | 9/2003 | Steinman et al. | 361/759 |
| 7,092,251 | B1 * | 8/2006 | Henry | 361/679.36 |
| 7,154,757 | B1 * | 12/2006 | Pavol et al. | 361/740 |
| 7,187,542 | B2 * | 3/2007 | Wu | 361/679.39 |
| 7,204,469 | B2 * | 4/2007 | Chen et al. | 248/694 |
| 7,257,886 | B2 * | 8/2007 | Haager et al. | 29/739 |

(Continued)

*Primary Examiner* — Hoa C Nguyen
*Assistant Examiner* — Xanthia C Cunningham
(74) *Attorney, Agent, or Firm* — Locke Lord LLP; Tim Tingkang Xia, Esq.

(57) ABSTRACT

An electronic device includes an electronic module, a tray, and a carrier. The tray includes a bottom plate and two elastic members located at two opposite sides of the accommodation space. The electronic module is located between the two elastic members. Each elastic arm of each elastic member has a pushed portion and a blocking portion extending to the accommodation space. The tray moves together with the electronic module, between a first position and a second position. When the tray is located at the first position together with the electronic module, each blocking portion is at least partially located in each corresponding first positioning hole of the electronic module. With the tray moves, together with the electronic module, from the first position to the second position, each stopper presses against each corresponding pushed portion, thereby enabling the corresponding blocking portion to detach from the corresponding first positioning hole.

11 Claims, 16 Drawing Sheets

(56) References Cited

U.S. PATENT DOCUMENTS

| | | | |
|---|---|---|---|
| 7,277,279 B2* | 10/2007 | Chen et al. | 361/679.33 |
| 7,375,960 B2* | 5/2008 | Blaalid et al. | 361/679.33 |
| 7,441,744 B2* | 10/2008 | Chen et al. | 248/694 |
| 7,701,702 B2* | 4/2010 | Chen et al. | 361/679.33 |
| 8,537,535 B2* | 9/2013 | Zhang et al. | 361/679.33 |
| 2004/0021047 A1* | 2/2004 | Dean et al. | 248/300 |
| 2004/0032709 A1* | 2/2004 | Liu et al. | 361/684 |
| 2004/0125556 A1* | 7/2004 | Chen et al. | 361/685 |
| 2005/0018397 A1* | 1/2005 | Kay et al. | 361/685 |
| 2005/0235295 A1* | 10/2005 | Hsu et al. | 720/600 |
| 2006/0171109 A1* | 8/2006 | Chang | 361/685 |
| 2006/0171110 A1* | 8/2006 | Li | 361/685 |
| 2006/0250766 A1* | 11/2006 | Blaalid et al. | 361/685 |
| 2006/0279925 A1* | 12/2006 | Shi et al. | 361/685 |
| 2007/0008693 A1* | 1/2007 | Yeh et al. | 361/685 |
| 2008/0089021 A1* | 4/2008 | Deng et al. | 361/685 |
| 2008/0123280 A1* | 5/2008 | Chen et al. | 361/685 |
| 2008/0239650 A1* | 10/2008 | Fujie et al. | 361/685 |
| 2008/0259554 A1* | 10/2008 | Qin et al. | 361/685 |
| 2009/0273896 A1* | 11/2009 | Walker et al. | 361/679.33 |
| 2011/0043994 A1* | 2/2011 | Cheng et al. | 361/679.33 |
| 2011/0085295 A1* | 4/2011 | Wu | 361/679.38 |
| 2011/0249392 A1* | 10/2011 | Kadri et al. | 361/679.37 |
| 2011/0267761 A1* | 11/2011 | Peng et al. | 361/679.31 |
| 2013/0215568 A1* | 8/2013 | Kumachi | 361/679.33 |
| 2013/0342988 A1* | 12/2013 | Peng et al. | 361/679.33 |
| 2014/0204540 A1* | 7/2014 | Lin et al. | 361/732 |

* cited by examiner

ELECTRONIC DEVICE WITH DETACHABLE ELECTRONIC MODULE

CROSS-REFERENCE TO RELATED APPLICATIONS

This non-provisional application claims priority under 35 U.S.C. §119(a) on Patent Application No(s). 201310090821.4 filed in China on Mar. 20, 2013, the entire contents of which are hereby incorporated by reference.

BACKGROUND OF THE INVENTION

1. Technical Field of the Invention

The disclosure relates to an electronic device, and more particularly to an electronic device for fixing an electronic module.

2. Description of the Related Art

In current computer equipment, generally a data storage device is required to be disposed, so as to store various data. Generally speaking, a user directly secures the data storage device in a shell of the computer equipment by a screw. A plurality of data storage devices are frequently arranged together, such that more data storage devices are disposed in a limited space.

However, in such a design, when it is required to mount or dismount the data storage devices, there is much time that is spent when mounting the data storage devices in the shell or dismounting the data storage devices from the shell in the limited space, this kind of design causes inconvenience to the user. In addition, in the modern society, it is very uneconomical to spend much time in mounting or dismounting the data storage devices.

Therefore, how to design a structure capable of quickly mounting and dismounting the data storage devices is a problem which technicians try to solve.

SUMMARY OF THE INVENTION

The disclosure provides an electronic device, comprising an electronic module, a tray, and a carrier. The tray forms an accommodation space for accommodating the electronic module. The tray comprises a bottom plate located at a bottom side of the accommodation space and two elastic members located at two opposite sides of the accommodation space. Each of the two elastic members includes an elastic arm. The electronic module is located between the two elastic arms. Each of the two elastic arms includes a pushed portion and a blocking portion extending toward the accommodation space. The carrier includes two stoppers extending into the accommodation space through the bottom plate of the tray and corresponding to the two pushed portions respectively. The tray is disposed on the carrier and is capable of moving, together with the electronic module, between a first position and a second position with respect to the two stoppers. Two opposite sides of the electronic module include two first positioning holes corresponding to the two blocking portions respectively. When the tray is located at the first position together with the electronic module, the blocking portion is at least partially located in each of the first positioning holes correspondingly. With the tray moves, together with the electronic module, from the first position to the second position with respect to each of the stoppers, each of the stoppers separately and correspondingly presses against each of the pushed portions so as to push each of the elastic arms to an outer side of the tray, thereby enabling each of the blocking portions of each of the elastic arms to detach from the corresponding first positioning holes.

BRIEF DESCRIPTION OF THE DRAWINGS

The disclosure will become more fully understood from the detailed description given herein below for illustration only, thus does not limit the disclosure, wherein.

DETAILED DESCRIPTION

Figure 1A:
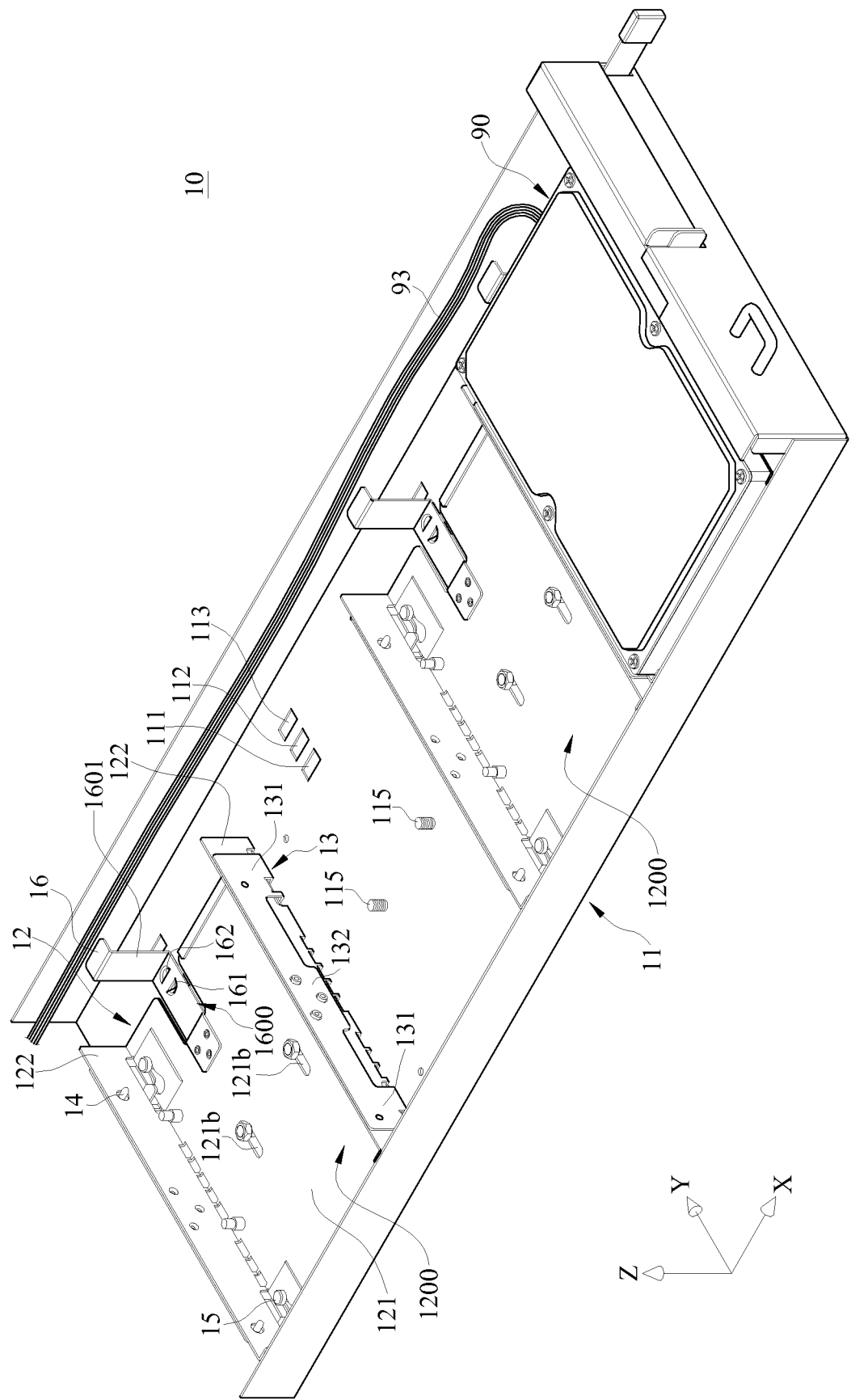
FIG. 1A is a perspective view of an electronic device according to an embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 1B:
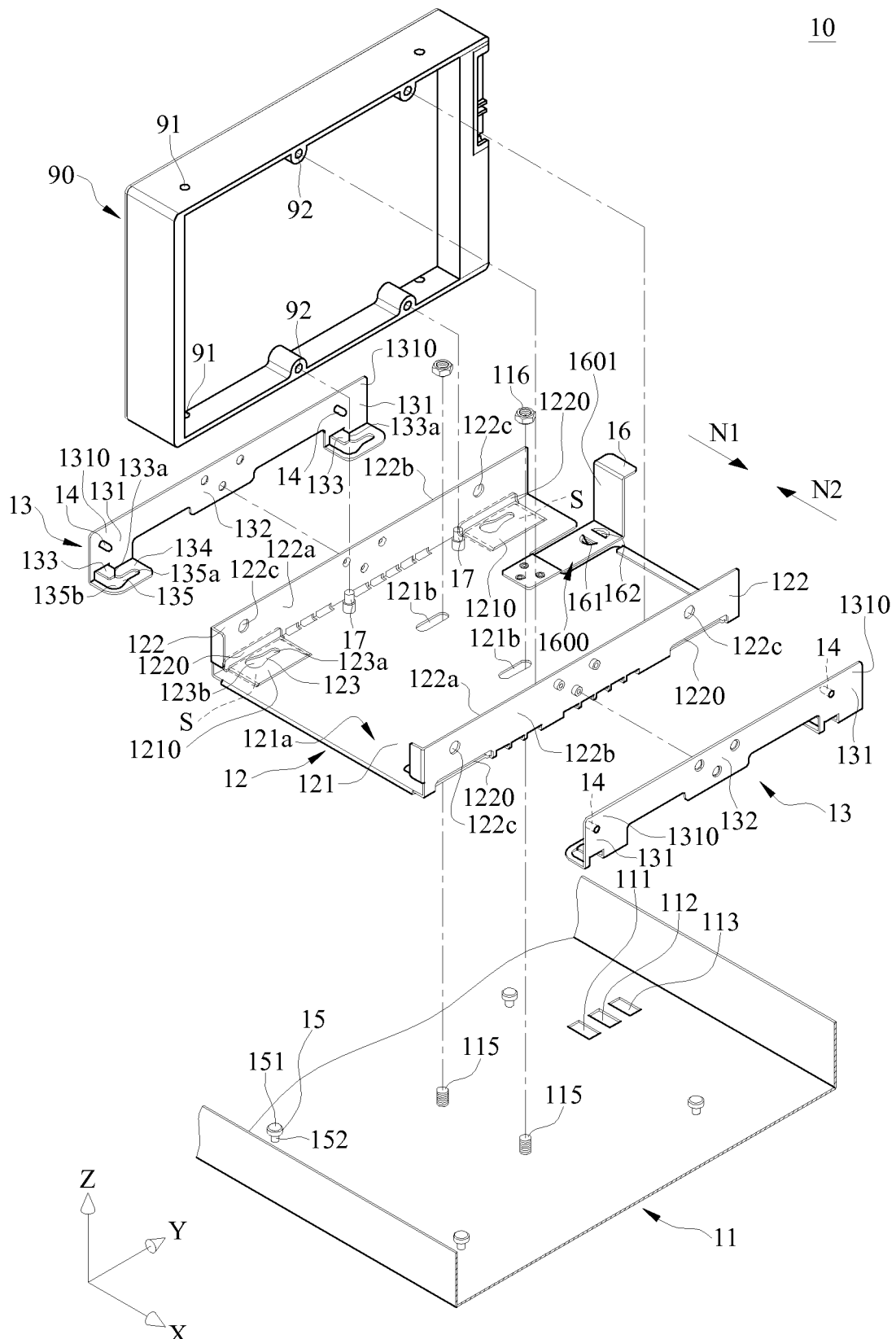
FIG. 1B is a perspective exploded view of the electronic device in FIG. 1A.

Referring to FIG. 1A and FIG. 1B, FIG. 1A is a perspective view of an electronic device 10 according to an embodiment of the disclosure, and FIG. 1B is a perspective exploded view of the electronic device 10 in FIG. 1A. The electronic device 10 of the disclosure is, for example, a server. The electronic device 10 comprises a carrier 11, a plurality of trays 12, and a plurality of electronic modules 90. Each of the plurality of electronic modules 90 is, for example, a hard disk. The carrier 11 is adapted for bearing at least a plurality of the trays 12, but the number of the trays 12 is not limited to the disclosure. Each tray 12 is capable of supporting and loading one of the plurality of electronic modules 90. The carrier 11 comprises a plurality of stoppers 15 which are fixedly disposed. In this embodiment, each tray 12 is corresponding to two pairs of stoppers 15. In view of that each pair of stoppers 15 have the same function, one pair of stoppers 15 thereof is described below.

The tray 12 forms an accommodation space 1200 for accommodating the electronic module 90. The tray 12 comprises a bottom plate 121 and two side walls 122 connected to the bottom plate 121, two elastic members 13 at two opposite sides of the accommodation space 1200, and a handle 16 with one end fixed at the bottom plate 121. The bottom plate 121 has an upper surface 121a. The side wall 122 has an inner side 122a and an outer side 122b opposite to each other. The electronic module 90 is accommodated on the upper surface 121a of the bottom plate 121 and between the inner side 122a of the side wall 122. A plurality of blocking convex columns 17 extending upward is disposed on the bottom plate 121 of the tray 12. When the tray 12 supports and loads the electronic module 90, each of the pluralities of blocking convex columns 17 is at least partially located in each of corresponding second positioning holes 92 at the bottom surface of the electronic module 90. The bottom plate 121 of the tray 12 has two guide grooves 121b. Two guide columns 115, fixed at the carrier 11, run through the guide grooves 121b respectively and each has an outer thread, and a nut 116 is connected to the guide column 115 through outer thread, so that movement of the tray 12 is limited on the carrier 11. The two guide grooves 121b are strip shapes and are parallel to each other. The guide column 115 of the carrier 11 runs through a corresponding guide groove 121b and enters the accommodation space 1200. When the tray 12 moves between a first position and a second position, the guide column 115 moves along the guide groove 121b with respect to the tray 12, and the two guide grooves 121b guide the tray 12 to move along a linear direction.

The elastic member 13 comprises an elastic arm 131 and a fixing portion 132 which are connected to each other. The fixing portion 132 is, for example, fixed at the outer side 122b of the side wall 122 in a riveting manner. The elastic arm 131 comprises a pushed portion 133 and a blocking portion 14 extending toward the accommodation space 1200. In this embodiment, the pushed portion 133 is sheet-shaped and is parallel to the bottom plate 121, and the blocking portion 14 is convex-and-column-shaped. When the elastic arm 131 is located at an engaging position (at this time, the tray 12 is located at the first position together with the electronic module 90), the blocking portion 14 is at least partially located in a first positioning hole 91 which is at a side of the electronic module 90. In this embodiment, the first positioning hole 91 is a round hole. When the elastic arm 131 is located at a releasing position (at this time, the tray 12 is located at the second position together with the electronic module 90), the blocking portion 14 detaches from (namely, leaves) the first positioning hole 91 which is at the side of the electronic module 90. The two pushed portions 133 protrude toward normal directions N1 and N2 of the inner side 122a, respectively. The normal direction N1 of the inner side 122a of the side wall 122, closer to the negative X direction, is the positive X direction. The normal direction N2 of the inner side 122a of the side wall 122, closer to the positive X direction, is the negative X direction. The pushed portion 133 is located above the upper surface 121a of the bottom plate 121. When the tray 12 is moved from the first position to the second position, the stopper 15 presses against the pushed portion 133 to enable the elastic arm 131 to move to the outer side of the tray 12 (moves from the engaging position to the releasing position), so that the blocking portion 14 detaches from (namely, leaves) the first positioning hole 91 at the side of the electronic module 90. When the tray 12 is located at the first position together with the electronic module 90, each pushed portion 133 is separated from the corresponding stopper 15. The elastic arm 131 is located at a rear end of the elastic member 13, and the fixing portion 132 is located at the center of the elastic member 13.

The pushed portion 133 extends into the accommodation space 1200 and includes a slope 133a. The tray 12 is capable of moving, together with the electronic module 90, from the first position to the second position along a linear direction (namely, the positive Y direction which is a straight line) with respect to the two stoppers 15. The slope 133a of the pushed portion 133 is slanted with respect to a linear direction. With the tray 12 moves, together with the electronic module 90, from the first position to the second position, the stopper 15 moves along the slope 133a of the corresponding pushed portion 133, with respect to the tray 12, and presses against the slope 133a so as to urge the corresponding elastic arm 131 to gradually offset to the outer side of the tray 12. The linear direction is parallel to the bottom plate 121 and the side wall 122.

The handle 16 is fixed at the bottom plate 121. The carrier 11 has a first engaging groove 111, a second engaging groove 112, and a third engaging groove 113 that are sequentially arranged. The handle 16 comprises an engaging portion 1600 abutting the carrier 11 and a force applying arm 1601 bending from the engaging portion 1600 and extending out, and the engaging portion 1600 has a first engaging protrusion 161 and a second engaging protrusion 162 that are arranged sequentially. When the tray 12 is located at the first position, the first engaging protrusion 161 is located in the first engaging groove 111, and the second engaging protrusion 162 is located in the second engaging groove 112. At this time, the position of the tray 12 is limited and the tray 12 is not easily moved. Please refer to FIG. 1C, which is a top view of the electronic device 10 in FIG. 1B when no electronic module 90 is mounted and a tray 12 is located at a second position. The bottom plate 121 has a notch 121c at a side thereof; the engaging portion 1600 is partly set in the notch 121c; the notch 121c provides space for the engaging portion's movement.

Back to FIGS. 1A and 1B. When the handle 16 is lifted (namely, pulled up), the first engaging protrusion 161 departs from the first engaging groove 111, and the second engaging protrusion 162 departs from the second engaging groove 112. Therefore, the tray is moved to the second position. When the tray 12 is located at the second position, the first engaging protrusion 161 is located in the second engaging groove 112, and the second engaging protrusion 162 is located in the third engaging groove 113. At this time, the position of the tray 12 is limited and the tray 12 is not moved easily. When the handle 16 is lifted, the first engaging protrusion 161 departs from the second engaging groove 112, and the second engaging protrusion 162 departs from the third engaging groove 113. Therefore, the tray is moved to the first position. An electrically connecting cable 93, connected to the electronic module 90, is capable of extending between the force applying arm 1601 of the handle 16 and the carrier 11.

In this embodiment, the side wall 122 has a side wall through hole 122c corresponding to the blocking portion 14. When the tray 12 is located at the first position together with the electronic module 90 (at this time, the elastic arm 131 of the elastic member 13 is located at the engaging position), the blocking portion 14 runs through the side wall through hole 122c and is at least partially located in the first positioning hole 91 at the side of the electronic module 90.

The elastic member 13 further comprises an extending portion 134, which is disposed at the elastic arm 131. Each of the extending portions 134 protrudes toward the normal directions N1 and N2 of the inner side 122a, and is located between the tray 12 and the carrier 11, respectively. When the tray 12 is located at the first position together with the electronic module 90, the two stoppers 15 thereof press against the inner surfaces of two corresponding extending portion through holes 135 in opposite directions, so as to pull the two elastic arms 131 in the opposite directions. Therefore, the electronic module 90 is clamped between the two elastic arms 131. The pressing of the stopper 15 at the inner surface of the extending portion through hole 135 is finally converted into a clamping force for the electronic module 90. It should be noted that the electronic module 90 is clamped between the two elastic arms 131, and the clamping may be direct clamping, namely, the two elastic arms 131 directly clamp the electronic module 90. In addition, the clamping may also be indirect clamping in other embodiments. Namely, because two side walls 122 are isolated between the elastic arm 131 and the electronic module 90, the two elastic arms 131 press against the two side walls 122 in the opposite directions so as to contact and clamp the electronic module 90 through the two side walls 122. Without isolations of the two side walls 122, the two elastic arms 131 may directly clamp the electronic module 90.

The bottom plate 121 of the tray 12 has a protruding portion 1210 corresponding to the extending portion 134, a movement space S for the corresponding extending portion 134 to move is formed between each protruding portion 1210 and the carrier 11. Each protruding portion 1210 has a bottom plate through hole 123. The stopper 15 runs through the bottom plate through hole 123 and is capable of moving in the corresponding bottom plate through hole 123 with respect to the tray 12. The bottom plate through hole 123 is in a long calabash shape and has a first end 123a and a second end 123b opposite to each other. When the tray 12 is located at the first position, the stopper 15 is located at the first end 123a of the bottom plate through hole 123. When the tray 12 is moved from the first position to the second position, the stopper 15 is moved from the first end 123a of the bottom plate through hole 123 to the second end 123b of the bottom plate through hole 123.

The stopper 15 has a head portion 151 and a neck portion 152. The diameter of the head portion 151 is greater than the diameter of the neck portion 152. The width of the first end 123a of the bottom plate through hole 123 is between the diameter of the head portion 151 and the width of the neck portion 152. The width of the second end 123b of the bottom plate through hole 123 is greater than the diameter of the head portion 151. The extending portion 134 has an extending portion through hole 135, and the stopper 15 runs through the extending portion through hole 135. The tray 12 is moved with respect to the carrier 11, so that the stopper 15 is moved in the extending portion through hole 135. Furthermore, the side wall 122 has a slot 1220. When the tray 12 is located at the first position together with the electronic module 90, each pushed portion 133 runs through the corresponding slot 1220 and extends into the accommodation space 1200. Each protruding portion 1210 is located between the corresponding pushed portion 133 and the extending portion 134. When the tray 12 is located at the first position together with the electronic module 90, each extending portion 134 is accommodated in the corresponding movement space S. When the tray 12 is moved, together with the electronic module 90, from the first position to the second position, each extending portion 134 is moved to an outer side of the corresponding movement space S corresponding to the offset of each elastic arm 131, respectively. The extending portion through hole 135 is in a long shape and has a first end 135a and a second end 135b opposite to each other. When the tray 12 is located at the first position, the stopper 15 is located at the first end 135a of the extending portion through hole 135. When the tray 12 is moved from the first position to the second position, the stopper 15 is moved from the first end 135a of the extending portion through hole 135 to the second end 135b of the extending portion through hole 135. Furthermore, the width of the first end 135a of the extending portion through hole 135 is between the diameter of the head portion 151 and the width of the neck portion 152. The width of the second end 135b of the extending portion through hole 135 is greater than the diameter of the head portion 151. In order to enhance the fixing for the tray 12, in this embodiment, when the tray 12 is located at the first position together with the electronic module 90, the stopper 15 interferes with the upper surface 121a of the bottom plate 121, so as to press the upper surface 121a of the bottom plate 121 downward. In this embodiment, the stopper 15 downwardly presses on the protruding portion 1210.

The elastic arm 131 comprises a plate-shaped main body portion 1310, and both the pushed portion 133 and the extending portion 134 are bent from the main body portion 1310 and extended outward. The blocking portion 14 is a convex column which is fixed at the main body portion 1310. When the tray 12 is located at the first position together with the electronic module 90, the main body portion 1310 abuts and presses against the outer side of the corresponding side wall 122. The main body portion 1310 is connected to the fixing portion 132, and the fixing portion 132 is fixed (for example, riveted) at the outer side of the corresponding side wall 122 so that the elastic arm 131 is mounted at the corresponding side wall 122.

Figure 1C:
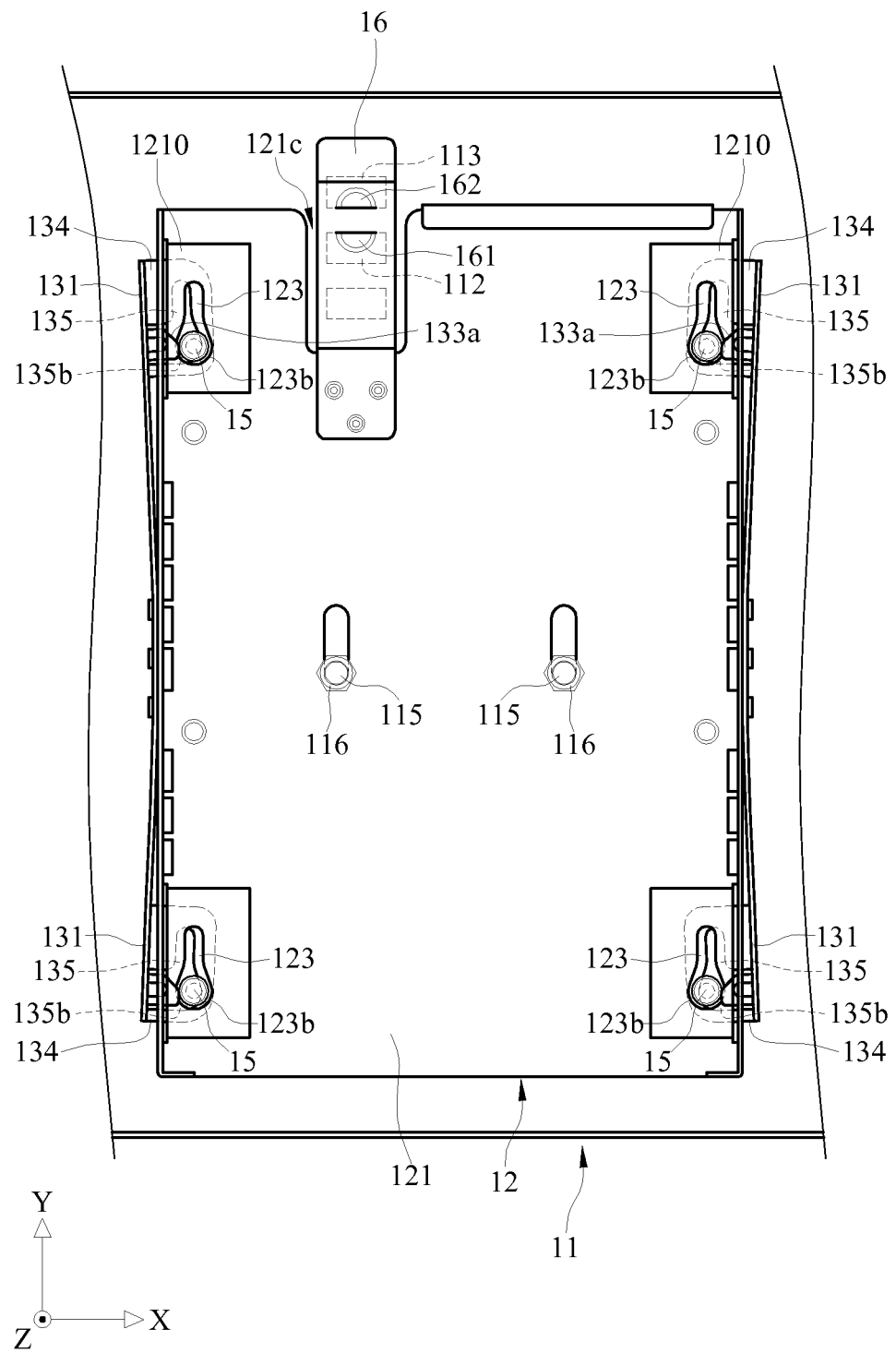
FIG. 1C is a top view of the electronic device in FIG. 1B when no electronic module is mounted and a tray is located at a second position.
Figure 1D:
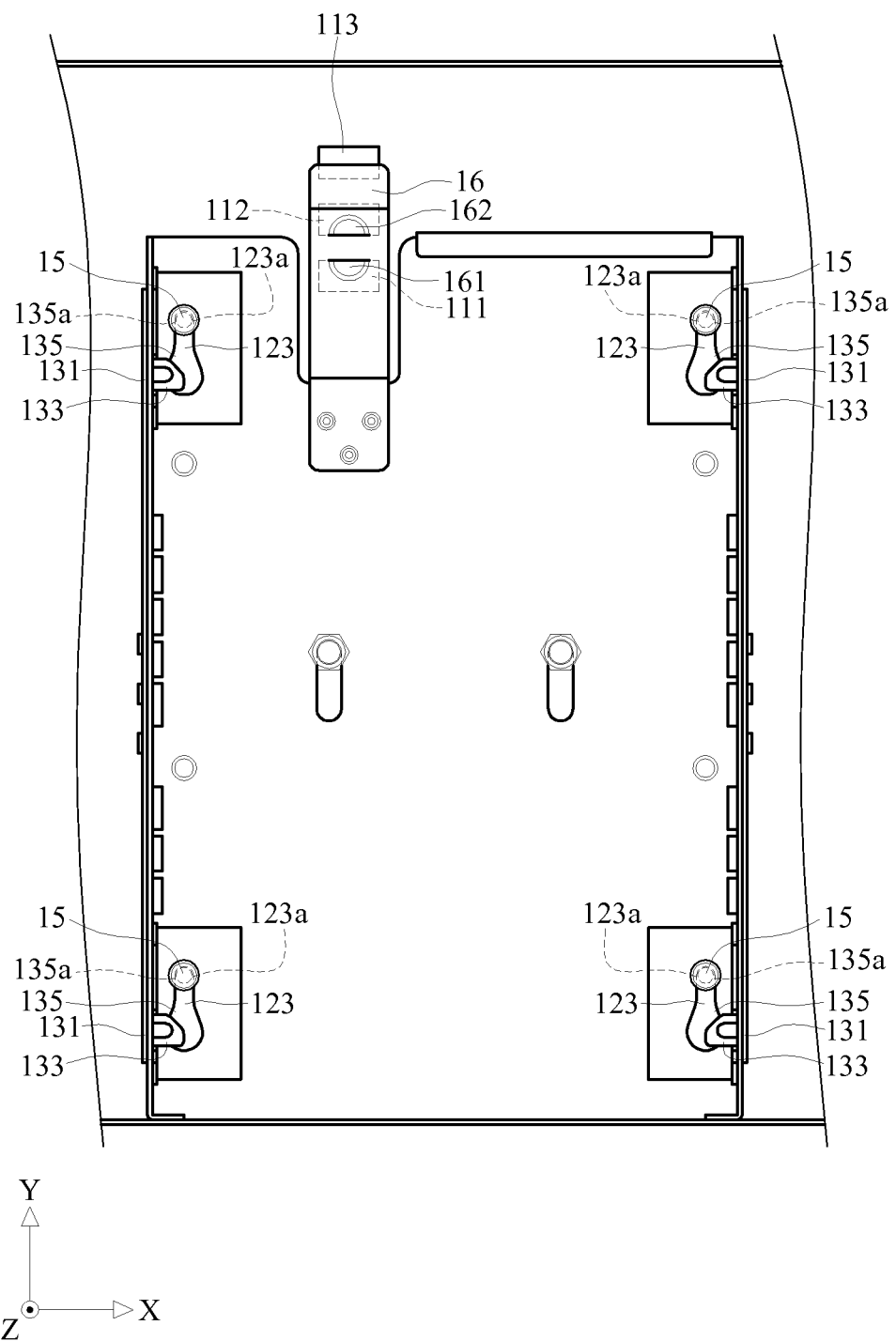
FIG. 1D is a top view of the electronic device in FIG. 1B when no electronic module is mounted and a tray is located at a first position.

Referring to FIG. 1C and FIG. 1D, FIG. 1D is a top view of the electronic device 10 in FIG. 1B when no electronic module 90 is mounted and a tray 12 is located at a first position. As shown in FIG. 1C. When a user intends to mount the tray 12 at the carrier 11, the stopper 15 may run through the bottom plate 121 and the extending portion 134 from the second end 135b of the extending portion through hole 135 and the second end 123b of the bottom plate through hole 123. Then, the elastic arm 131 is pushed aside outward, so as to make the stopper 15 press against the pushed portion 133. The first engaging protrusion 161 is located in the second engaging groove 112 and the second engaging protrusion 162 is located in the third engaging groove 113. The carrier 11 and the tray 12 are limited by use of the guide column 115 and the nut 116, and the cooperation between the guide groove 121b and the guide column 115 limits the movement direction of the tray 12, so that the tray 12 may be moved with respect to the carrier 11 along the positive/negative Y direction, but cannot be moved with respect to the carrier along the positive/negative X direction.

When the user intends to push the tray 12 into the first position, the handle 16 is lifted toward the positive Z direction, so as to make the first engaging protrusion 161 detach from the second engaging groove 112 and make the second engaging protrusion 162 detach from the third engaging groove 113. The user may directly push the tray 12 toward the negative Y direction, so that the electronic device 10 is located at the position as shown in FIG. 1D, and the tray 12 is located at the first position. At this time, the stopper 15 is located at the first end 123a of the bottom plate through hole 123 and the first end 135a of the extending portion through hole 135, but does not press against the pushed portion 133. After the handle 16 is released, the first engaging protrusion 161 is located in the first engaging groove 111 and the second engaging protrusion 162 is located in the second engaging groove 112.

When the tray 12 is intended to be pushed to the second position, so as to prepare to mount the electronic module 90, the handle 16 is lifted toward the positive Z direction, so as to make the first engaging protrusion 161 detach from the first engaging groove 111 and make the second engaging protrusion 162 detach from the second engaging groove 112. The user may directly push the tray 12 toward the positive Y direction, so that the electronic device 10 is located at the position as shown in FIG. 1C, and the tray 12 is located at the second position. At this time, the stopper 15 is moved from the first end 123a of the bottom plate through hole 123 to the second end 123b of the bottom plate through hole 123, and the stopper 15 is also moved from the first end 135a of the extending portion through hole 135 to the second end 135b of the extending portion through hole 135. At this time, the stopper 15 presses against the pushed portion 133 so as to make the elastic arm 131 leave the tray 12 and move to the releasing position. After the handle 16 is released, the first engaging protrusion 161 is located in the second engaging groove 112 and the second engaging protrusion 162 is located in the third engaging groove 113.

Figure 1E:
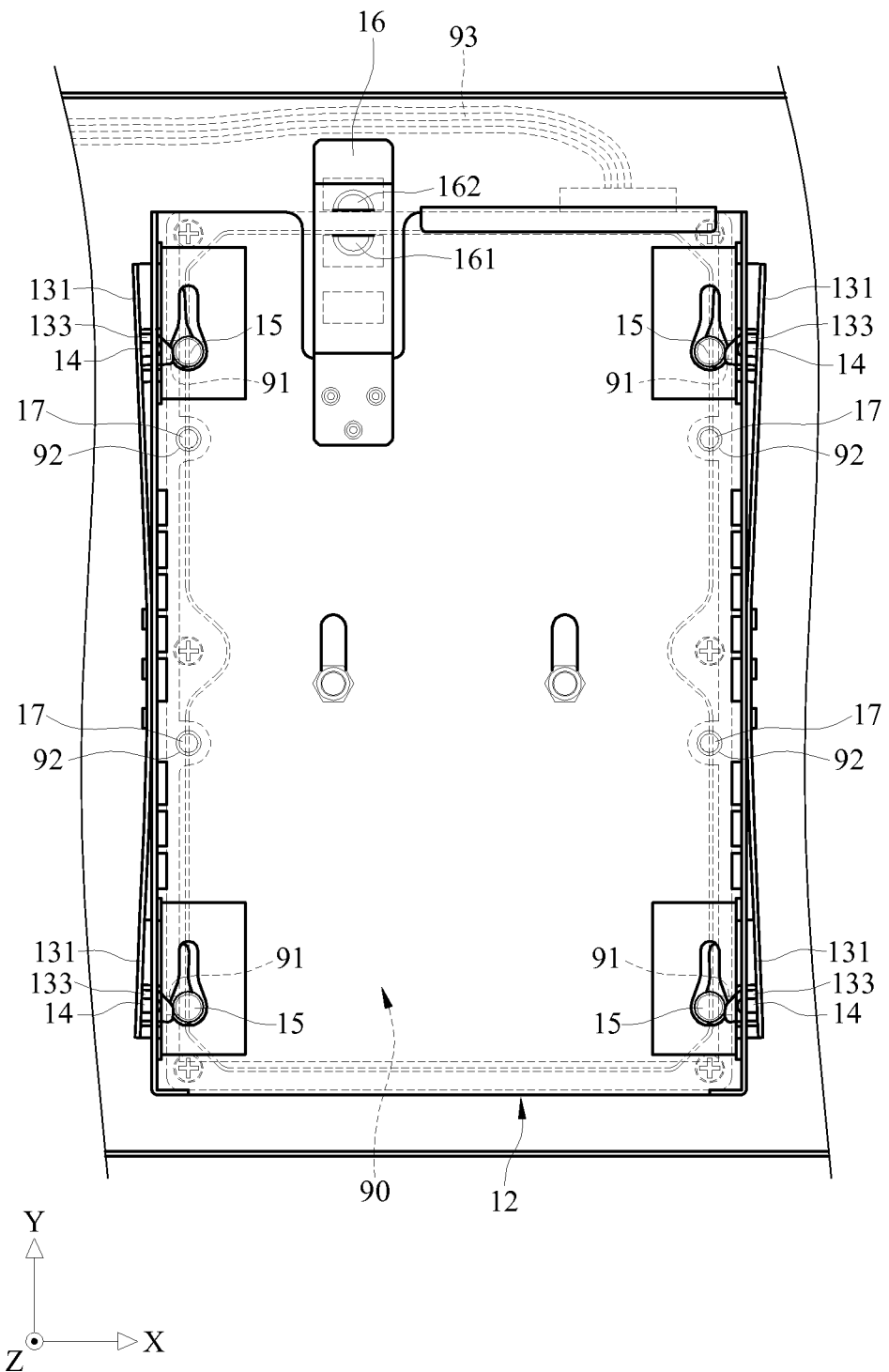
FIG. 1E is a top view of the electronic device in FIG. 1B when an electronic module is mounted and a tray is located at a second position.
Figure 1F:
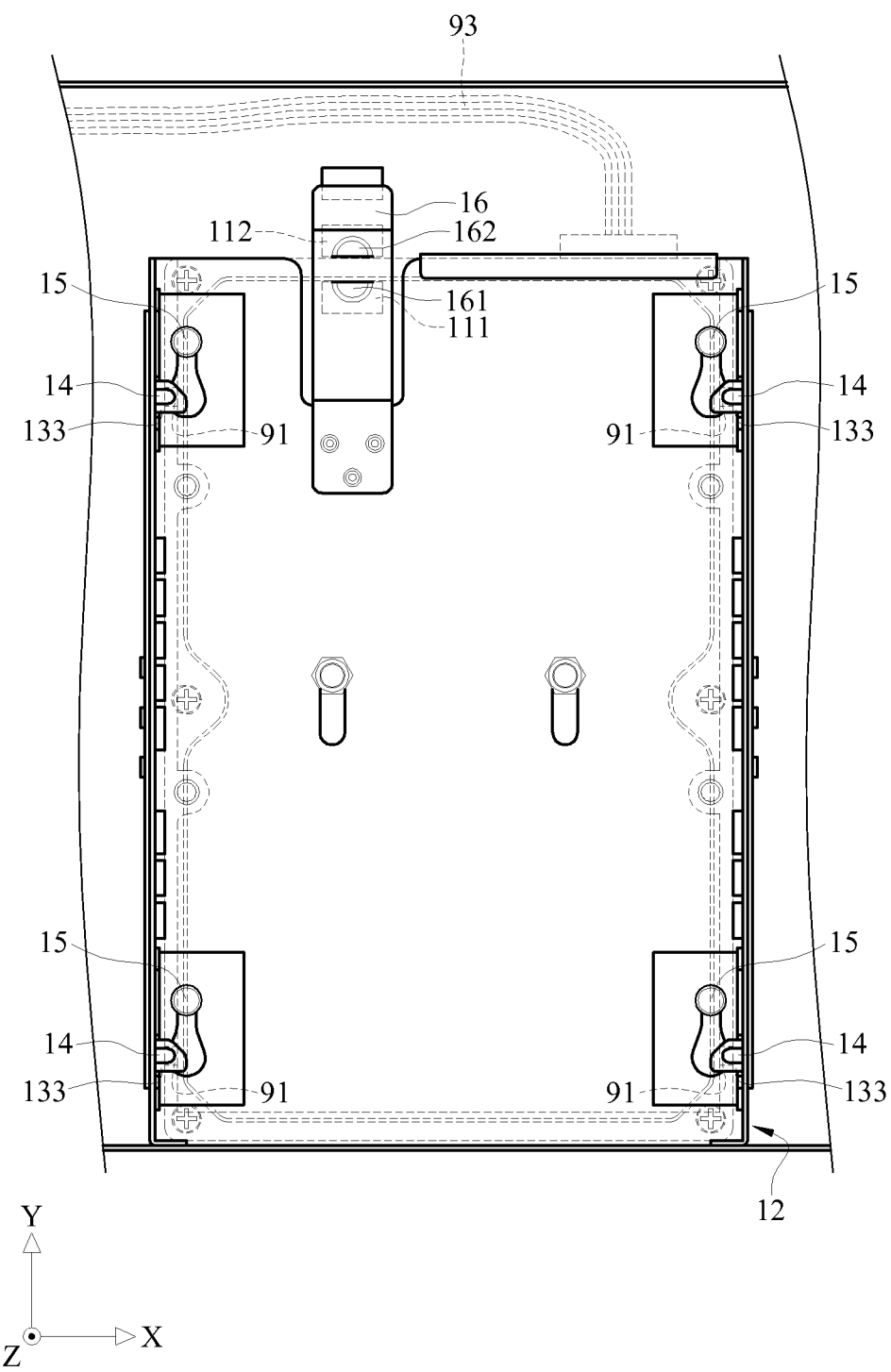
FIG. 1F is a top view of the electronic device in FIG. 1B when an electronic module is mounted and a tray is located at a first position.

Referring to FIG. 1E and FIG. 1F, FIG. 1E is a top view of the electronic device 10 in FIG. 1B when an electronic module 90 is mounted and a tray 12 is located at a second position, and FIG. 1F is a top view of the electronic device 10 in FIG. 1B when an electronic module 90 is mounted and a tray 12 is located at a first position. As shown in FIG. 1E, when the user intends to mount the electronic module 90 in the electronic device 10, the tray 12 is located at the second position, and the elastic arm 131 is located at the releasing position. At this time, the electronic module 90 may also be electrically connected to another electronic device through the electric connecting cable 93. Then, the second positioning hole 92 of the bottom surface of the electronic module 90 is aligned with a blocking convex column 17, so that the blocking convex column 17 is at least partially located in the second positioning hole 92 of the bottom surface of the electronic module 90. In this embodiment, the second positioning hole 92 is a round hole. At this time, the electronic module 90 cannot move with respect to the tray 12 in the positive X direction, the negative X direction, the positive Y direction and the negative Y direction. The user may lift the handle 16 toward the positive Z direction, so as to make the first engaging protrusion 161 detach from the second engaging groove 112 and make the second engaging protrusion 162 detach from the third engaging groove 113. The user may directly move the electronic module 90 and the tray 12 toward the negative Y direction, so that the electronic device 10 is located at the position as shown in FIG. 1F, and the tray 12 is located at the first position. At this time, the stopper 15 does not press against the pushed portion 133. The blocking portion 14 is at least partially located in a first positioning hole 91 at a side of the electronic module 90. At this time, the electronic module 90 cannot move with respect to the tray 12 in the positive Z direction and the negative Z direction. After the handle 16 is released, the first engaging protrusion 161 is located in the first engaging groove 111 and the second engaging protrusion 162 is located in the second engaging groove 112.

When the user intends to dismount the electronic module 90, the handle 16 is lifted toward the positive Z direction, so as to make the first engaging protrusion 161 detach from the first engaging groove 111 and make the second engaging protrusion 162 detach from the second engaging groove 112. The user may directly move the electronic module 90 and the tray 12 toward the positive Y direction, so that the electronic device 10 is as that shown in FIG. 1E, and the tray 12 is located at the second position. At this time, the stopper 15 presses against the pushed portion 133 so as to make the elastic arm 131 leave the tray 12 and move to the releasing position, and the blocking portion 14 leaves the first positioning hole 91 at the side of the electronic module 90. After the handle 16 is released, the first engaging protrusion 161 is located in the second engaging groove 112 and the second engaging protrusion 162 is located in the third engaging groove 113. The electronic module 90 leaves the electronic device 10 along the positive Z direction. Therefore, when the electronic module 90 is mounted or dismounted, it is unnecessary to use a screw to secure the electronic module 90, and the trouble and the times spent in mounting or dismounting the electronic module 90 are reduced.

Figure 2A:
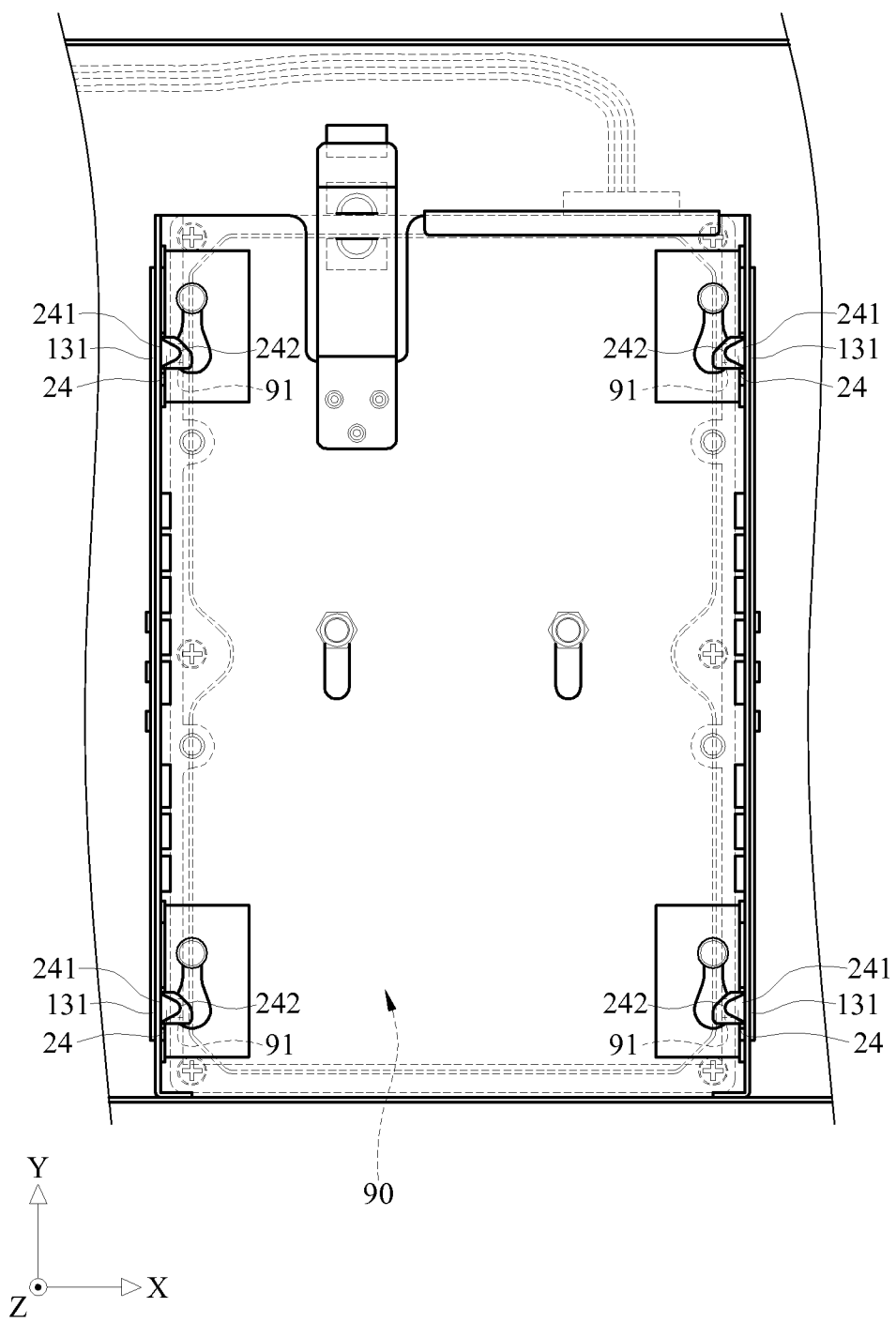
FIG. 2A is a top view of an electronic device according to another embodiment of the disclosure.
Figure 2B:
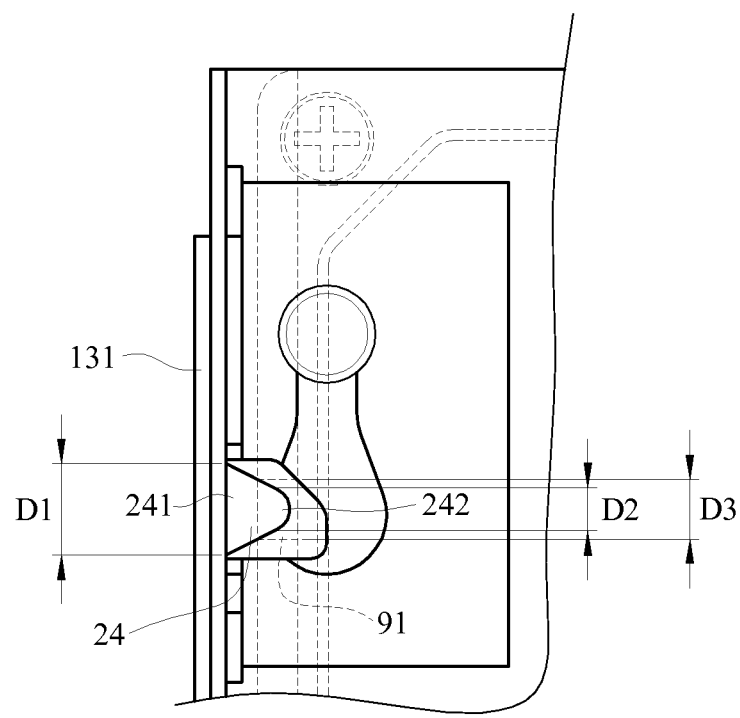
FIG. 2B is a partial enlarged top view of the electronic device in FIG. 2A.

Referring to FIG. 2A and FIG. 2B, FIG. 2A is a top view of an electronic device 20 according to another embodiment of the disclosure, and FIG. 2B is a partial enlarged top view of the electronic device 20 in FIG. 2A. The electronic device 20 is substantially similar to the electronic device 10 in FIG. 1B, and therefore the similarity is not described again herein. However, in this embodiment, a blocking portion 24 has a root portion 241 and an end portion 242, and performs fixing through the root portion 241. The end portion 242 is in a circular arc shape. The outer diameter of the blocking portion 24 gradually decreases from the root portion 241 toward the end portion 242. The outer diameter D1 of the root portion 241 is greater than the hole diameter D3 of a first positioning hole 91 at a side of the electronic module 90, and the outer diameter D2 of the end portion 242 is less than the hole diameter D3 of the first positioning hole 91 at the side of the electronic module 90. Therefore, when the tray 12 is located at the first position together with the electronic module 90, the end portion 242 is located in the first positioning hole 91 at the side of the electronic module 90, and the root portion 241 may not enter the first positioning hole 91 because the size thereof is large, and the root portion 241 presses against the hole opening of the first positioning hole 91. Therefore, the blocking portions 24 at the two sides are capable of pressing in opposite directions so as to clamp the electronic module 90 together, which prevents the electronic module 90 from being influenced by vibration.

Figure 3:
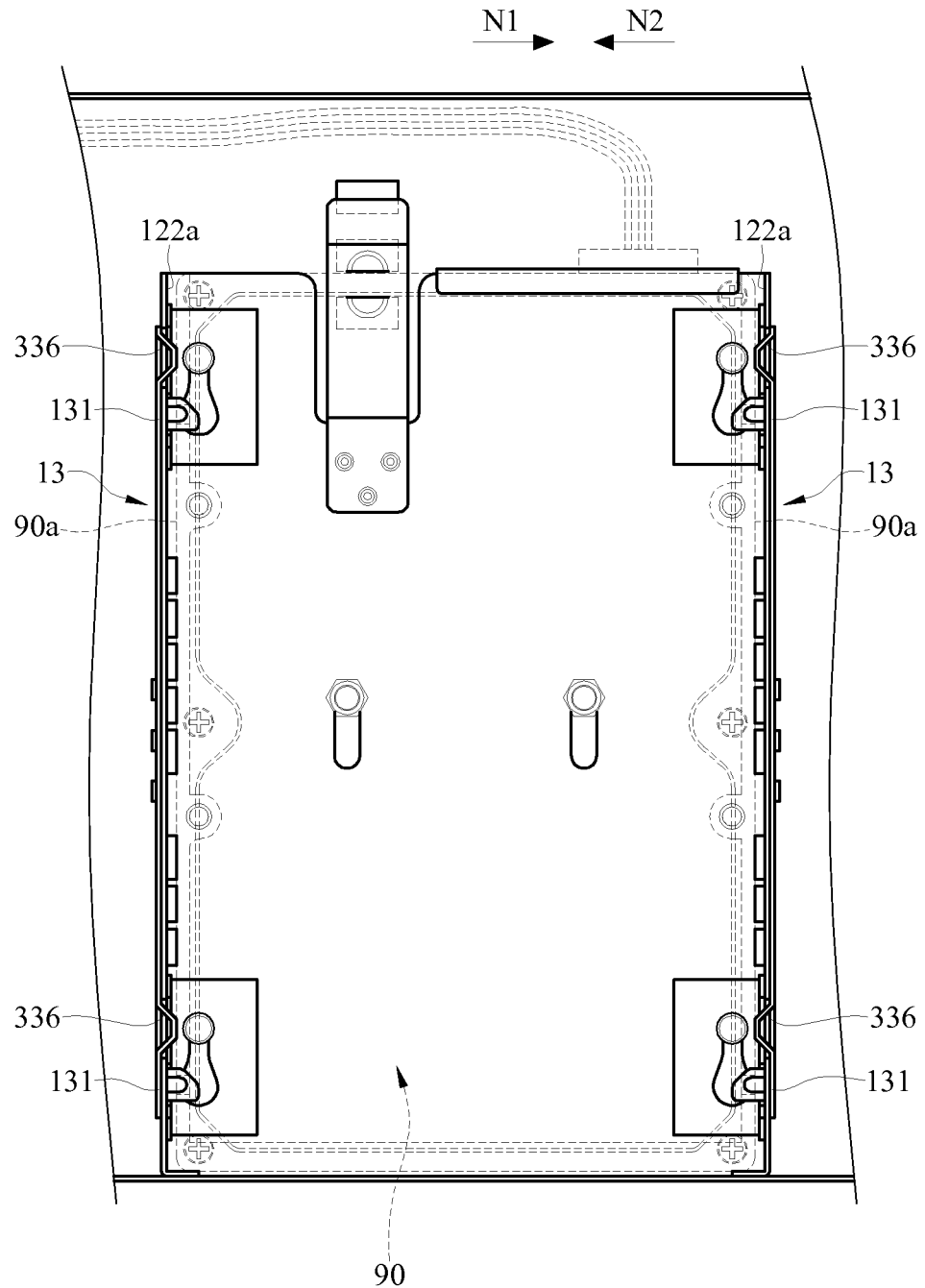
FIG. 3 is a top view of an electronic device according to another embodiment of the disclosure.

Please refer to FIG. 3, which is a top view of an electronic device 30 according to another embodiment of the disclosure. The electronic device 30 is substantially similar to the electronic device 10 in FIG. 1B, and therefore the similarity is not described again herein. However, in this embodiment, the elastic member 13 has a pressing protrusion 336, which is disposed at the elastic arm 131 and protrudes toward normal directions N1 and N2 of the inner side 122a. When the tray 12 is located at the first position together with the electronic module 90, the pressing protrusion 336 is pressed against the side 90a of the electronic module 90. Therefore, the electronic module 90 is prevented from being influenced by vibration.

Figure 4A:
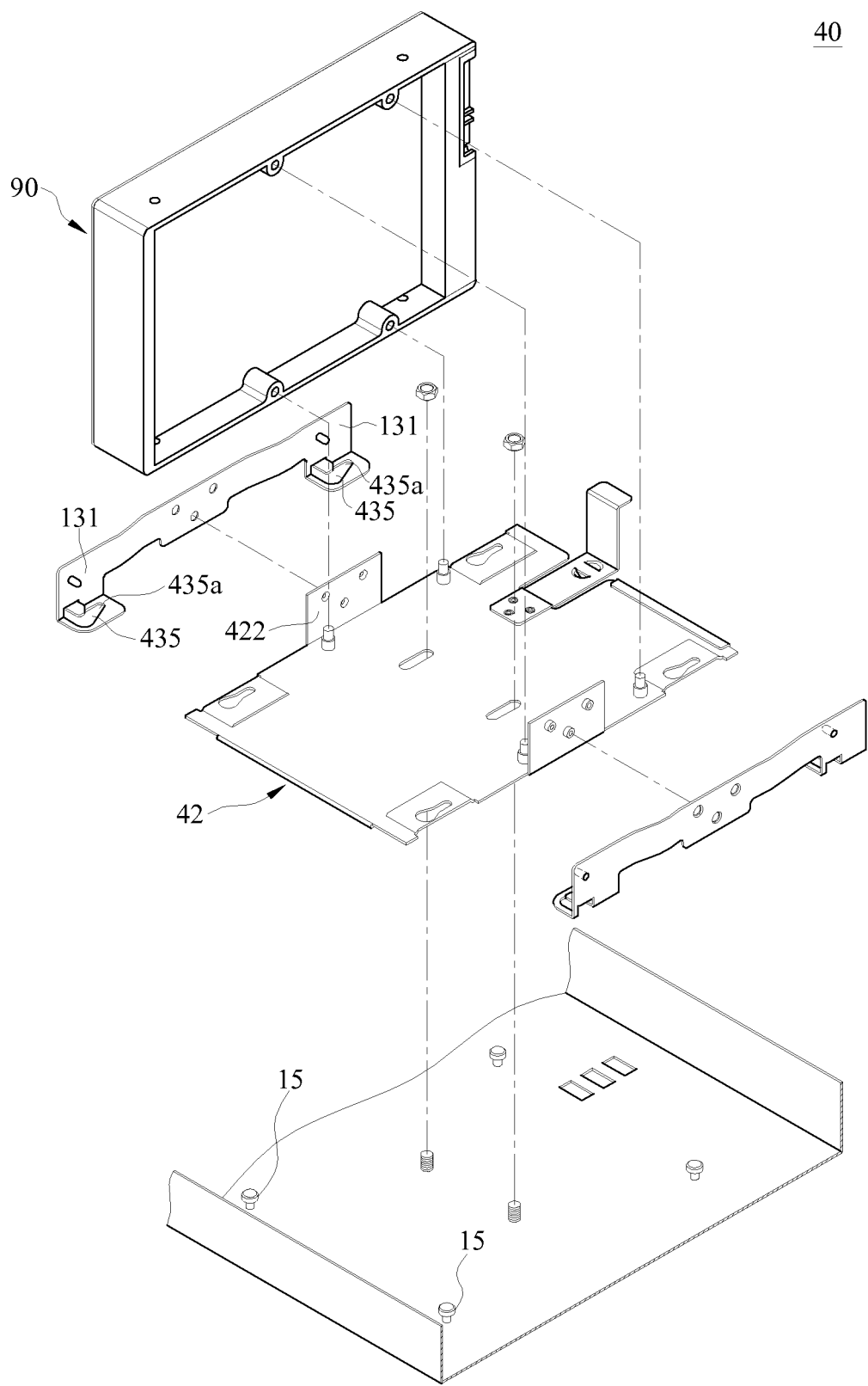
FIG. 4A is a perspective exploded view of an electronic device according to another embodiment of the disclosure.
Figure 4B:
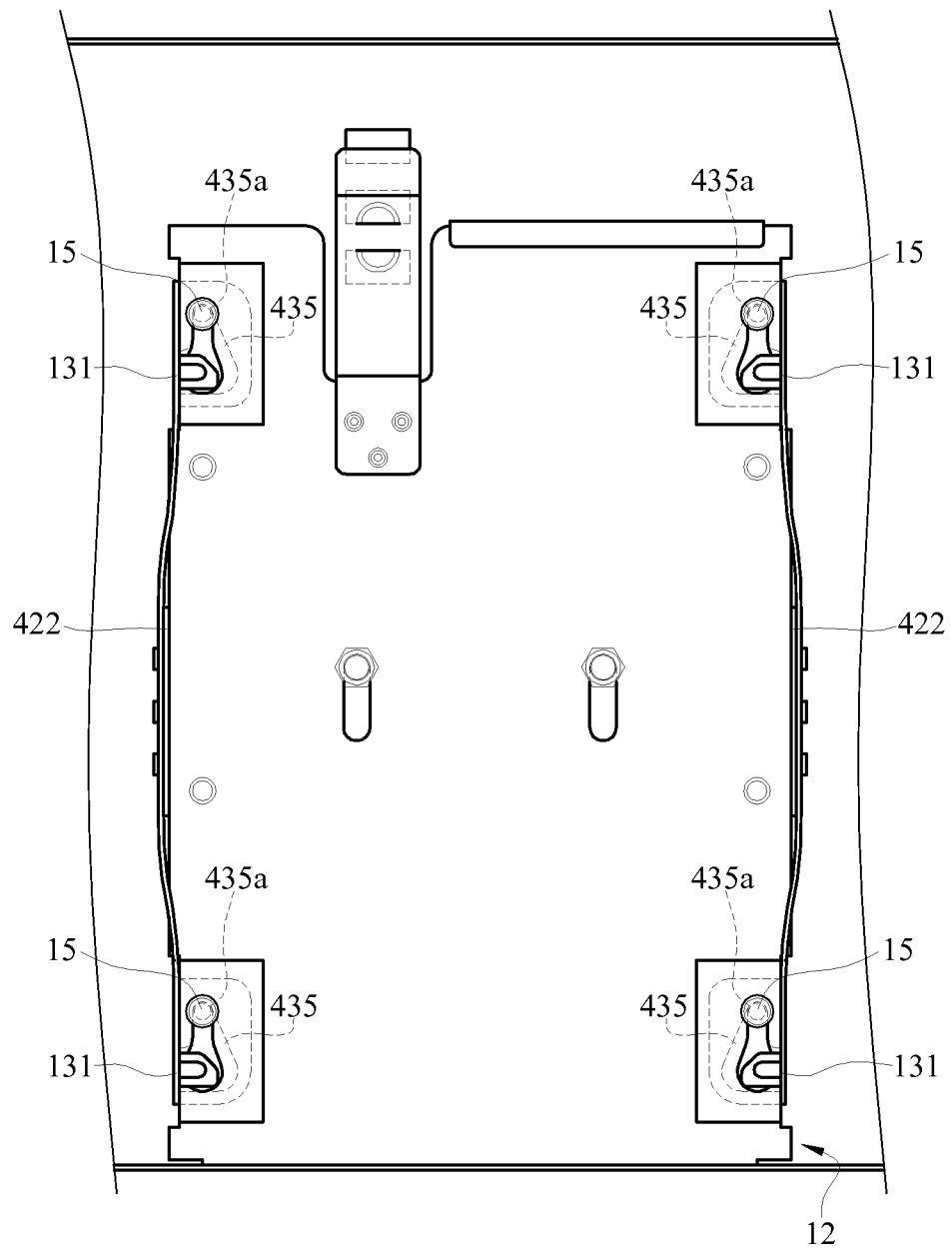
FIG. 4B is a top view of the electronic device in FIG. 4A when no electronic module is mounted and a tray is located at a first position.
Figure 4C:
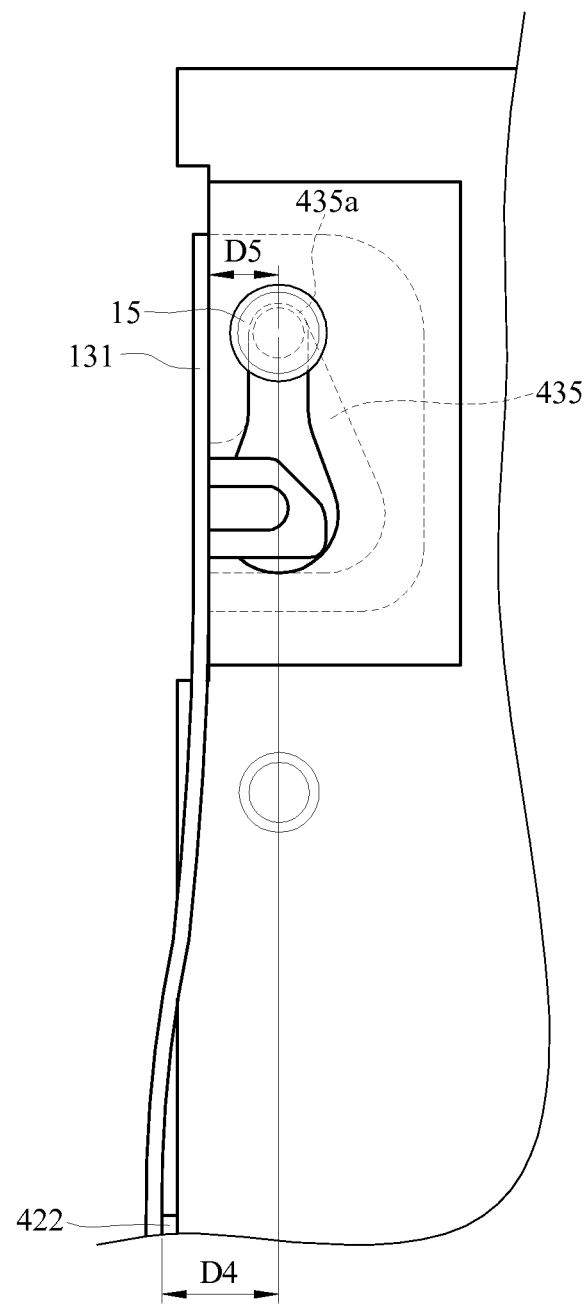
FIG. 4C is a partial enlarged top view of the electronic device in FIG. 4B.
Figure 4D:
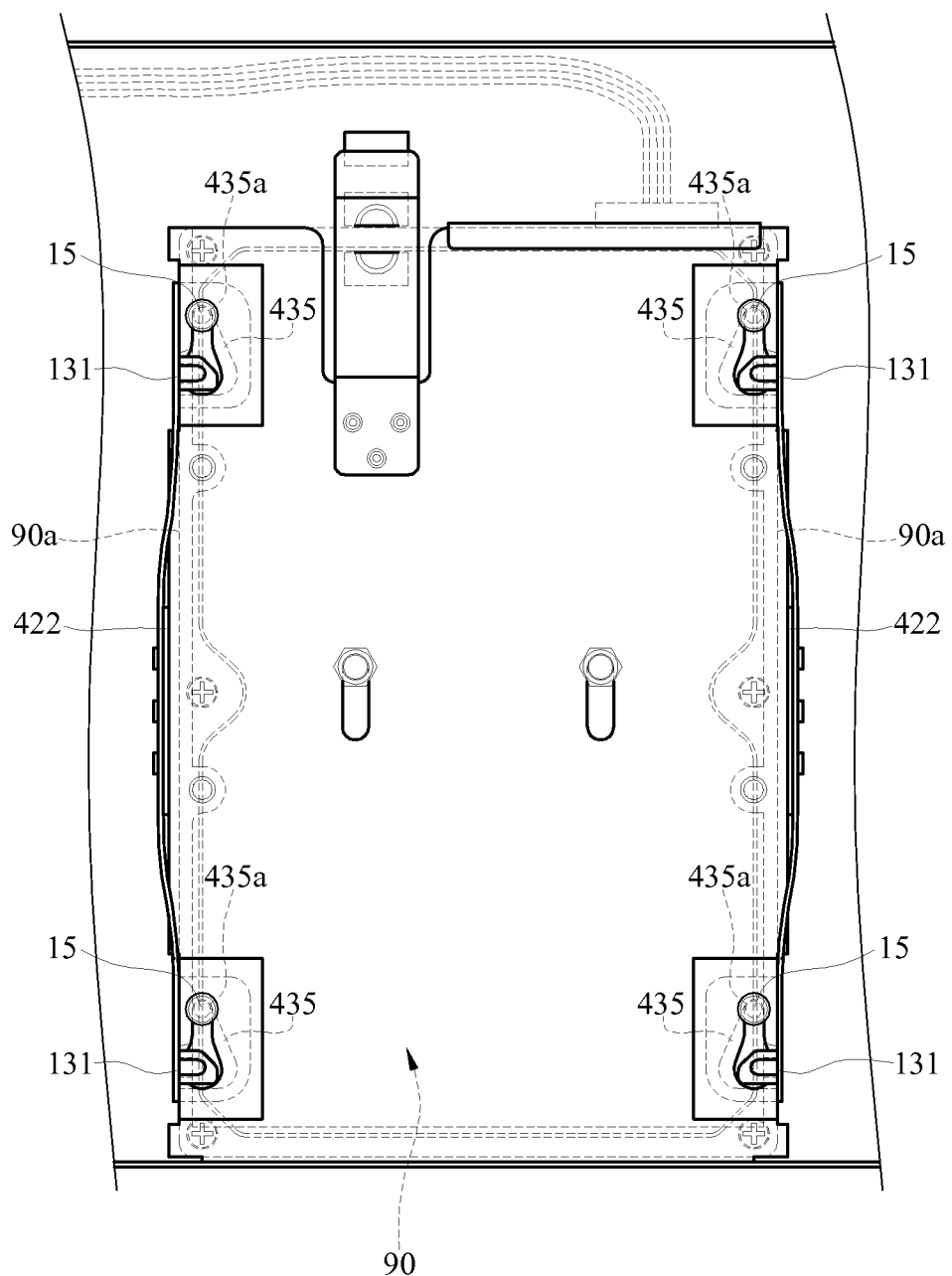
FIG. 4D is a top view of the electronic device in FIG. 4A when an electronic module is mounted and a tray is located at a first position.

Referring to FIG. 4A, FIG. 4B, FIG. 4C and FIG. 4D, FIG. 4A is a perspective exploded view of an electronic device 40 according to another embodiment of the disclosure, FIG. 4B is a top view of the electronic device 40 in FIG. 4A when no electronic module 90 is mounted and a tray 42 is located at a first position, FIG. 4C is a partial enlarged top view of the electronic device 40 in FIG. 4B, and FIG. 4D is a top view of the electronic device 40 in FIG. 4A, when an electronic module 90 is mounted and a tray 42 is located at a first position. The electronic device 40 is substantially similar to the electronic device 10 in FIG. 1B, and therefore the similarity is not described again herein. However, in this embodiment, no part corresponding to the elastic arm 131 is disposed on a side wall 422 of the tray 42. The shortest distance D4 between the stopper 15 and the extending face of the side wall 422 is greater than the distance D5 between a first end 435a of an extending portion through hole 435 and the elastic arm 131. Therefore, as shown in FIG. 4B, when the tray 42 is located at the first position, the elastic arm 131 is pulled by the stopper 15 into certain space for accommodating the electronic module 90. When the electronic module 90 is mounted at the electronic device 40, the elastic arm 131 is directly pressed against the side 90a of the electronic module 90, such that strength with which the elastic arm 131 clamps the electronic module 90 is increased. Therefore, the electronic module 90 is prevented from being influenced by vibration.

Figure 5A:
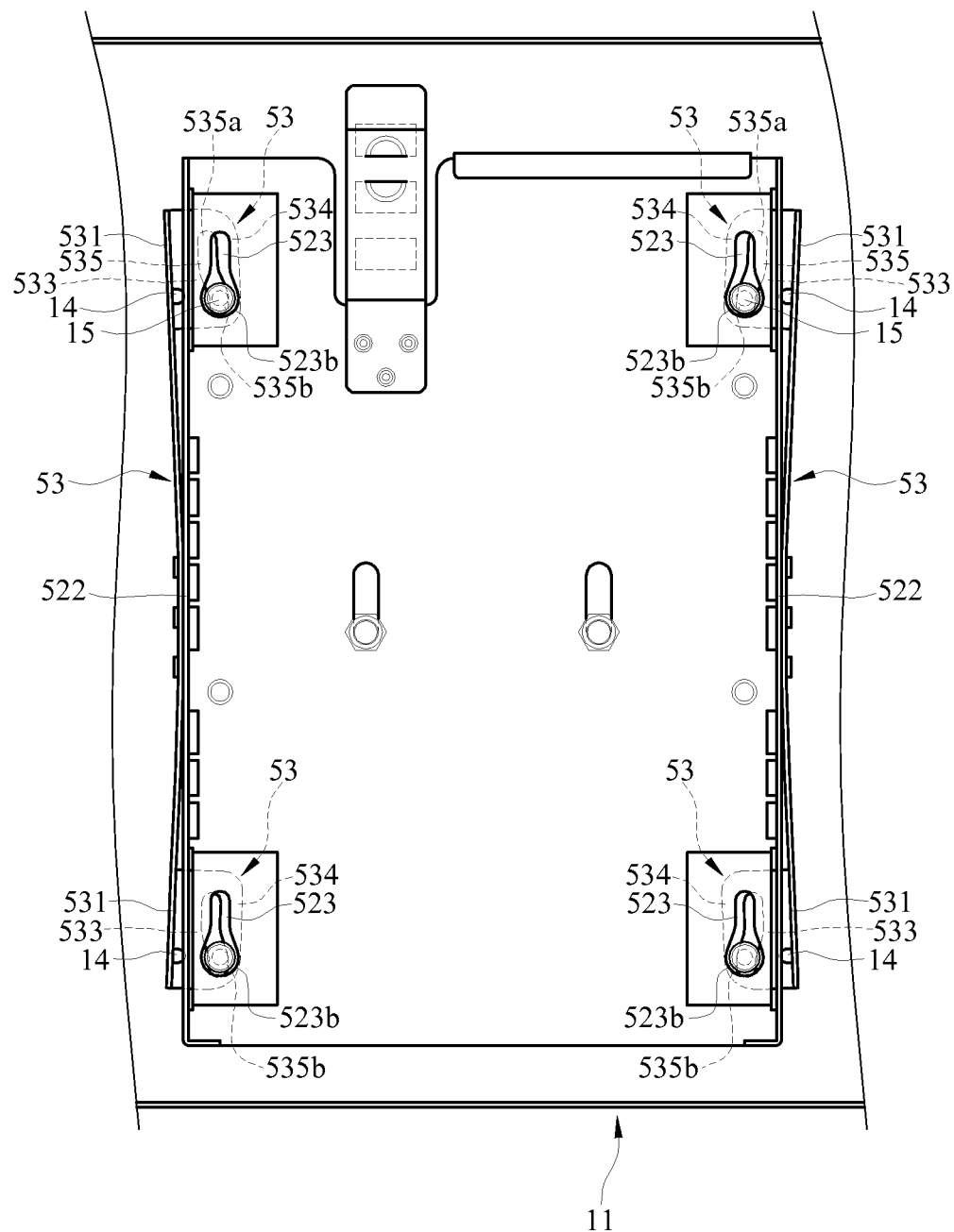
FIG. 5A is a top view of an electronic device according to another embodiment of the disclosure when no electronic module is mounted and a tray is located at a first position.
Figure 5B:
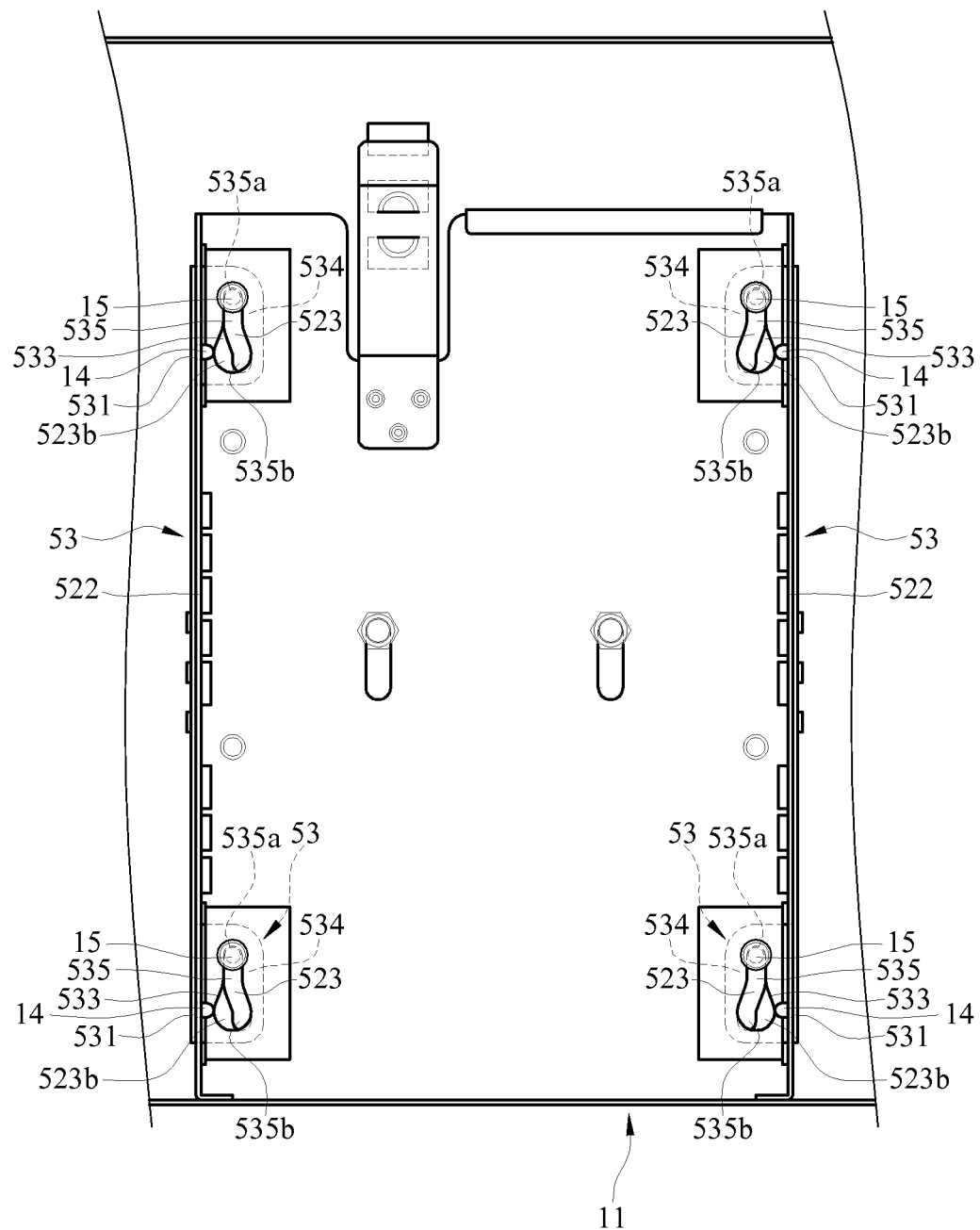
FIG. 5B is a top view of the electronic device in FIG. 5A when no electronic module is mounted and a tray is located at a second position.
Figure 5C:
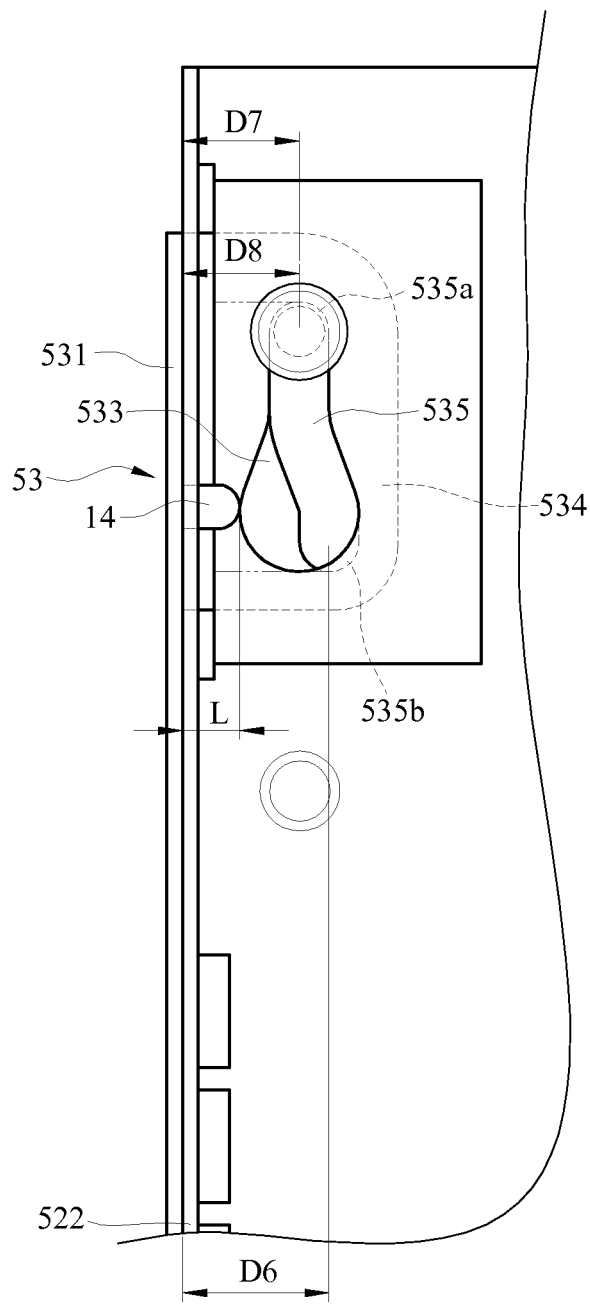
FIG. 5C is a partial enlarged top view of the electronic device in FIG. 5A.

Referring to FIG. 5A, FIG. 5B and FIG. 5C, FIG. 5A is a top view of an electronic device 50 according to another embodiment of the disclosure when no electronic module 90 is mounted and a tray 52 is located at a first position, FIG. 5B is a top view of the electronic device 50 in FIG. 5A when no electronic module 90 is mounted and a tray 52 is located at a second position, and FIG. 5C is a partial enlarged top view of the electronic device 50 in FIG. 5A. The electronic device 50 is substantially similar to the electronic device 10 in FIG. 1B, and therefore the similarity is not described again herein. However, in this embodiment, a pushed portion 533 is located between a tray 52 and a carrier 11. An elastic member 53 further comprises an extending portion 534, which is disposed on an elastic arm 531 and around the pushed portion 533 and is also located between the tray 52 and the carrier 11. Two ends of the extending portion 534 are connected to the pushed portion 533, respectively. An extending portion through hole 535 is formed between the pushed portion 533 and the extending portion 534, the stopper 15 runs through the extending portion through hole 535, and the pushed portion 533 and the extending portion 534 are located at two opposite sides of the extending portion through hole 535, respectively. The tray 52 is moved with respect to the carrier 11 so that the stopper 15 is moved in the extending portion through hole 535. The extending portion through hole 535 has a first end 535a and a second end 535b. When the tray 52 is located at the first position, the stopper 15 is located at the first end 535a of the extending portion through hole 535. When the tray 52 is moved from the first position to the second position, the stopper 15 is moved from the first end 535a of the extending portion through hole 535 to the second end 535b of the extending portion through hole 535. The distance D6 between the second end 535b of the extending portion through hole 53 and the elastic arm 531 is greater than or equal to the sum of the distance D7 between the stopper 15 and an extending plane of a side wall 522 plus the length L of the blocking portion 14. Therefore, when the tray 52 is moved from the first position to the second position, and the stopper 15 is moved from the first end 535a of the extending portion through hole 535 to the second end 535b of the extending portion through hole 535, the stopper 15 is capable of pushing the pushed portion 533 to the outer side so as to make the blocking portion 14 leave the electronic module 90.

In this embodiment, the width of the first end 535a of the extending portion through hole 535 is between the width of the head portion 151 and the width of the neck portion 152. The width of the second end 535b of the extending portion through hole 535 is also between the width of the head portion 151 and the width of the neck portion 152, and the width of the second end 535b of the bottom plate through hole 523 is also between the width of the head portion 151 and the width of the neck portion 152, but the width is not limited thereto. The head portion 151 and the neck portion 152 are combined by assembly, namely, after the neck portion 152 runs through the bottom plate through hole 523, the head portion 151 is mounted on the neck portion 152.

In this embodiment, the distance D7 between the stopper 15 and the extending plane of the side wall 522 is approximately equal to the distance D8 between the first end 535a of the extending portion through hole 535 and the elastic arm 531, but is not limited thereto. In other embodiments, the distance D7 between the stopper 15 and the extending face of the side wall 522 is also greater than the distance D8 between the first end 535a of the extending portion through hole 535 and the elastic arm 531, so that the elastic arm 531 is pulled by the stopper 15 into the space for accommodating the electronic module 90 (similar to that shown in FIGS. 4B and 4D).

To sum up, the electronic device of the disclosure is capable of limiting the movement of the electronic module by locating the blocking portion disposed at the elastic arm into the first positioning hole of the electronic module when the elastic arm of the elastic member is located at the engaging position, so as to fix the electronic module. The blocking convex column disposed on the bottom plate may limit the movement of the electronic module along the X direction and the Y direction. When the electronic module needs to be dismounted, the elastic arm of the elastic member is located at the releasing position, so that the blocking portion disposed at the elastic arm leaves the first positioning hole of the electronic module, and the electronic module is moved away along the Z direction. In addition, the shape of the blocking portion disposed at the elastic arm may further enable the blocking portion to block the first positioning hole of the electronic module, so as to prevent the electronic module from being influenced by vibration. The pressing protrusion disposed at the elastic arm may further press against a side of the electronic module, so as to prevent the electronic module from being influenced by vibration, too. Furthermore, the elastic arm at the engaging position may be pulled by the stopper into the space for accommodating the electronic module, and when the electronic module is accommodated, the elastic arm presses against a side of the electronic module, so as to increase the strength with which the elastic arm clamps the electronic module, thereby preventing the electronic module from being influenced by vibration.

What is claimed is:

1. An electronic device, comprising:
   an electronic module;
   a tray, forming an accommodation space for accommodating the electronic module, wherein the tray comprises a bottom plate located at a bottom side of the accommodation space and two elastic members located at two opposite sides of the accommodation space, each of the two elastic members includes an elastic arm, the electronic module is located between the two elastic arms, and each of the two elastic arms includes a pushed portion and a blocking portion extending toward the accommodation space; and
   a carrier, comprising two stoppers extending into the accommodation space through the bottom plate of the tray and corresponding to the two pushed portions respectively, wherein the tray is disposed on the carrier and is capable of moving, together with the electronic module, between a first position and a second position with respect to the two stoppers;

wherein, two opposite sides of the electronic module include two first positioning holes corresponding to the two blocking portions respectively; when the tray is located at the first position together with the electronic module, each of the blocking portions is at least partially located in each of the first positioning holes correspondingly; with the tray moves, together with the electronic module, from the first position to the second position with respect to each of the stoppers, each of the stoppers separately and correspondingly presses against each of the pushed portions so as to make each of the elastic arms pushed outward, thereby enabling each of the blocking portions of each of the elastic arms to detach from each of the first positioning holes correspondingly.

2. The electronic device according to claim 1, wherein the tray is capable of moving, together with the electronic module, from the first position to the second position along a linear direction with respect to the two stoppers, wherein each of the pushed portions extends into the accommodation space and includes a slope being slant with respect to the linear direction; with the tray moves, together with the electronic module, from the first position to the second position, each of the stoppers separately and correspondingly moves along each of the slopes with respect to the tray and presses against each of the slopes separately and correspondingly so as to make each of the elastic arms pushed outward gradually.

3. The electronic device according to claim 2, further comprising: a handle with one end fixed at the bottom plate, wherein the carrier has a first engaging groove, a second engaging groove, and a third engaging groove that are sequentially arranged, the handle comprises an engaging portion abutting the carrier and a force applying arm bending and extending from the engaging portion, and the engaging portion has a first engaging protrusion and a second engaging protrusion that are sequentially arranged; when the tray is located at the first position, the first engaging protrusion is located in the first engaging groove and the second engaging protrusion is located in the second engaging groove; when the tray is located at the second position, the first engaging protrusion is located in the second engaging groove and the second engaging protrusion is located in the third engaging groove; when the tray is located at the first position and the handle is lifted through force applying arm, the first engaging protrusion and the second engaging protrusion detach from the first and the second engaging groove respectively; and when the tray is located at the second position and the handle is lifted through force applying arm, the first engaging protrusion and the second engaging protrusion of the handle detach from the second and the third engaging groove, respectively.

4. The electronic device according to claim 3, wherein the bottom plate has a notch at a side thereof; the engaging portion is partly set in the notch; the notch provides space for the engaging portion's movement.

5. The electronic device according to claim 1, wherein each of the stoppers has a head portion and a neck portion, each of the head portions is used for pressing against each of the pushed portions correspondingly; when the tray is located at the first position together, each of the stoppers interferes with an upper surface of the bottom plate so as to downwardly press on the upper surface of the bottom plate.

6. The electronic device according to claim 1, wherein each of bottom sides of the two elastic arms further bends and extends out to form an extending portion, each of the extending portions has an extending portion through hole, and each of the stoppers separately and correspondingly runs through each of the extending portion through holes; when the tray moves, together with the electronic module, between the first position and the second position, each of the stoppers moves in each of the extending portion through holes correspondingly with respect to the tray; and when the tray is located at the first position together with the electronic module, the two stoppers press against inner surfaces of the two extending portion through holes in opposite directions so as to inward pull the two elastic arms, thereby enabling the electronic module to be clamped between the two elastic arms.

7. The electronic device according to claim 6, wherein the tray further comprises two side walls connected to the bottom plate and substantially vertical to the bottom plate, the two side walls are respectively corresponding to the two elastic arms and located between the two elastic arms, and the two side walls include two side wall through holes for the two blocking portions to run through; when the tray is located at the first position together with the electronic module, the two elastic arms press against the two side walls in opposite directions under the inward pulling of the two stoppers, so that the two side walls clamp the electronic module tightly.

8. The electronic device according to claim 7, wherein each of the side walls includes a slot, each of the pushed portions separately and correspondingly runs through each of the slots and extends into the accommodation space, the bottom plate includes two protruding portions respectively corresponding to the two extending portions, a movement space is formed between each of the protruding portions and the carrier for each of the extending portions to move, each of the protruding portions is located between each of the extending portions and each of the pushed portions correspondingly, each of the protruding portions has a bottom plate through hole, and each of the stoppers separately and correspondingly runs through each of the bottom plate through holes and is capable of moving in each of the bottom plate through holes correspondingly with respect to the tray; when the tray is located at the first position together with the electronic module, each of the extending portions is accommodated in the movement space correspondingly; when the tray moves, together with the electronic module, from the first position to the second position, each of the extending portions separately moves toward an outer side of the movement space.

9. The electronic device according to claim 8, wherein each of the elastic arms comprises a main body portion which is plate-shaped, each of the pushed portions and each of the extending portions extend from each of the main body portions, and each of the blocking portions is a convex column fixed at each of the main body portions; and when the tray is located at the first position together with the electronic module, each of the main body portions separately and correspondingly abuts and presses against an outer side of each of the side walls.

10. The electronic device according to claim 9, wherein each of the elastic arms further includes a fixing portion connected to each of the main body portions correspondingly, and each of the fixing portions is fixed at the outer side of each of the side walls correspondingly.

11. The electronic device according to claim 1, wherein the bottom plate further includes a plurality of blocking convex columns and two guide grooves, the two guide grooves are strip-shaped and parallel to each other, the bottom of the electronic module includes a plurality of second positioning holes for accommodating the blocking convex columns, the carrier includes two guide columns fixedly disposed, and the two guide columns respectively and correspondingly run through the two guide grooves and enter the accommodation space; and when the tray moves between the first position and the second position, each of the guide columns moves along each of the guide grooves correspondingly with respect to the tray, and the two guide grooves guide the tray to move linearly.

* * * * *